United States Patent
Haynes et al.

(10) Patent No.: US 10,351,250 B2
(45) Date of Patent: Jul. 16, 2019

(54) RELEASABLE BULKHEAD

(71) Applicant: Goodrich Corporation, Charlotte, NC (US)

(72) Inventors: Timothy C. Haynes, Prescott Valley, AZ (US); Daniel Bahena, Phoenix, AZ (US)

(*) Notice: Subject to any disclaimer, the term of this patent is extended or adjusted under 35 U.S.C. 154(b) by 285 days.

(21) Appl. No.: 15/583,406

(22) Filed: May 1, 2017

(65) Prior Publication Data

US 2018/0312266 A1    Nov. 1, 2018

(51) Int. Cl.
*B64D 25/14*    (2006.01)

(52) U.S. Cl.
CPC ..................... *B64D 25/14* (2013.01)

(58) Field of Classification Search
CPC .............. B64D 25/14; B63B 2027/145; B63C 2009/0082
USPC ........ 244/138 R, 146, 905; 441/96; 137/224, 137/225, 226; 114/345
See application file for complete search history.

(56) References Cited

U.S. PATENT DOCUMENTS

| | | | | |
|---|---|---|---|---|
| 3,359,579 A | * | 12/1967 | Reffell | B63C 9/02 114/345 |
| 3,473,641 A | * | 10/1969 | Fisher | A62B 1/20 193/25 B |
| 3,669,217 A | | 6/1972 | Fisher | |
| 3,674,124 A | | 7/1972 | Summer | |
| 3,679,025 A | | 7/1972 | Rummel | |
| 3,866,734 A | * | 2/1975 | Elkins | F16L 23/06 137/512 |
| 3,897,861 A | * | 8/1975 | Miller | B64D 25/14 182/48 |
| 5,711,495 A | * | 1/1998 | Danielson | B64D 25/14 242/421 |
| 6,298,970 B1 | * | 10/2001 | Targiroff | B64D 25/14 182/48 |
| 2004/0104307 A1 | * | 6/2004 | Stokes | B64D 25/14 244/137.2 |
| 2010/0258677 A1 | | 10/2010 | O'Donnell et al. | |

FOREIGN PATENT DOCUMENTS

| | | |
|---|---|---|
| GB | 911236 | 11/1962 |
| GB | 1201915 | 8/1970 |
| GB | 2060529 | 5/1981 |

OTHER PUBLICATIONS

European Patent Office, European Search Report dated Jul. 31, 2018 in Application No.

* cited by examiner

*Primary Examiner* — Bret Hayes
(74) *Attorney, Agent, or Firm* — Snell & Wilmer L.L.P.

(57) ABSTRACT

An inflatable evacuation device may include a tube defining a chamber. A releasable bulkhead may be coupled to an inner surface of the tube and defining a first chamber portion and a second chamber portion within the chamber. The releasable bulkhead may comprise a first mating portion and a second mating portion. The first mating portion and the second mating portion may be configured to releasably engage to restrict a fluid flow between the first chamber portion and the second chamber portion.

18 Claims, 8 Drawing Sheets

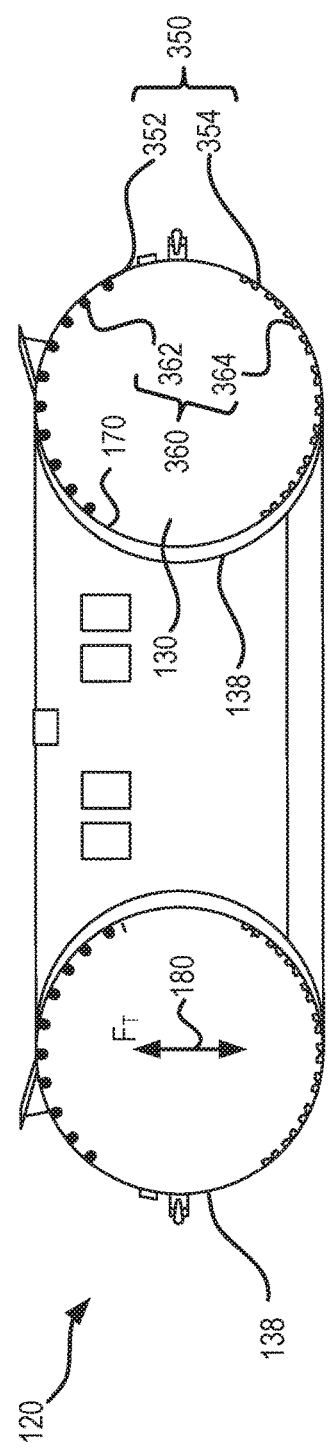
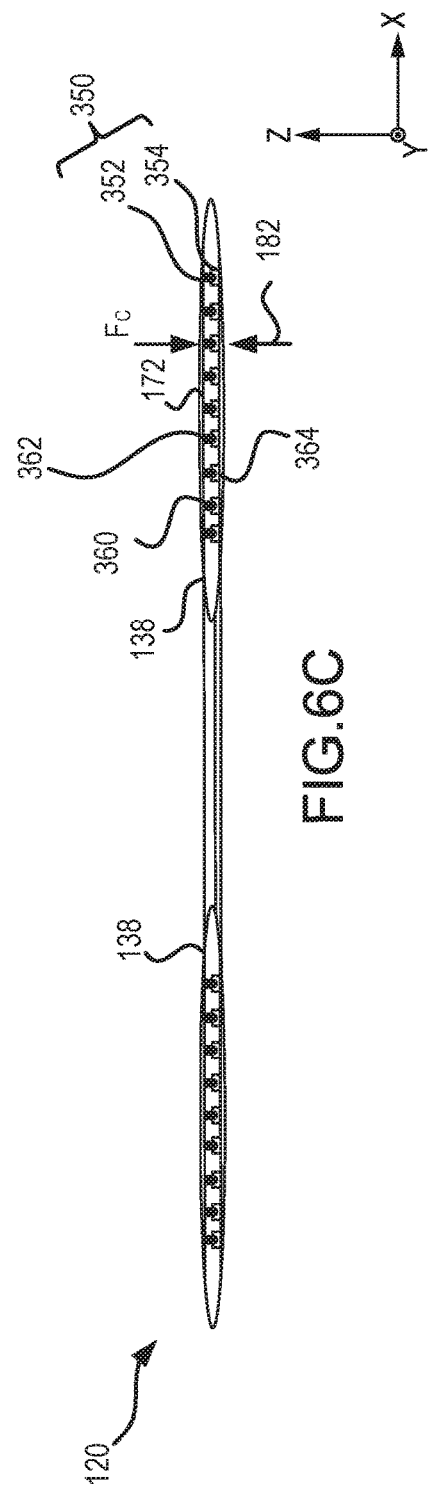

RELEASABLE BULKHEAD

FIELD

The present disclosure relates to inflatable evacuation systems and, in particular, to bulkheads for inflatable devices.

BACKGROUND

In the event of an aircraft evacuation, evacuation assemblies, such as evacuation slides, are often deployed to safely usher passengers from the aircraft to the ground. Emergency evacuation slides may be used to exit an aircraft absent a jet way or other means of egress for passengers. The evacuation system may deploy from a door sill or a side of the aircraft fuselage, for example. The inflatable slide deployment is controlled by external restraints placed externally to the inflatable slide which may release in stages in response to internal slide pressure. Emergency evacuation slides may undergo a number of deployments during development, for example, during functional testing of slide deployment.

SUMMARY

An inflatable evacuation device having an internal releasable bulkhead is disclosed, in accordance with various embodiments. An inflatable evacuation device may include a tube defining a chamber. A releasable bulkhead may be coupled to an inner surface of the tube and defining a first chamber portion and a second chamber portion within the chamber. The releasable bulkhead may comprise a first mating portion and a second mating portion. The first mating portion and the second mating portion may be configured to releasably engage to restrict a fluid flow between the first chamber portion and the second chamber portion.

In various embodiments, the first mating portion may be configured to separate from the second mating portion in response to a force applied to the releasable bulkhead exceeding a threshold force. The second chamber portion may be configured to inflate in response to the first mating portion separating from the second mating portion. The first mating portion and the second mating portion may comprise at least one of a hook and loop or a snap. the first mating portion and the second mating portion may be configured to releasably engage to form a blocking portion configured to restrict a fluid flow between the first chamber portion and the second chamber portion. The releasable bulkhead may extend transversely across the inner surface of the tube. The releasable bulkhead may extend longitudinally along the inner surface of the tube.

An evacuation system is also provided. The evacuation system may comprise an inflatable evacuation device having a tube defining a chamber. The inflatable evacuation device may comprise a releasable bulkhead coupled to an inner surface of the tube. The releasable bulkhead may have a first mating portion and a second mating portion. The second mating portion may be configured to separate from the first mating portion in response to a force applied to the releasable bulkhead exceeding a threshold force.

In various embodiments, the releasable bulkhead may define a first chamber portion and a second chamber portion within the chamber. The first mating portion and the second mating portion may releasably engage to restrict a fluid flow between the first chamber portion and the second chamber portion. The second chamber portion may be configured to inflate in response to the first mating portion separating from the second mating portion. The force applied to the releasable bulkhead may be due to a pressure increase that causes the first chamber portion to inflate. The first mating portion and the second mating portion may comprise at least one of a hook and loop or a snap. The releasable bulkhead may be reusable.

A method for deploying an inflatable evacuation device is also provided. The method may comprise the steps of coupling a releasable bulkhead to an inner surface of a chamber of the inflatable evacuation device to define a first chamber portion and a second chamber portion within the chamber, increasing pressure within the chamber to inflate the first chamber portion, restricting inflation of the second chamber, by the releasable bulkhead, during inflation of the first chamber portion, releasing the releasable bulkhead in response to a pressure within the first chamber portion exceeding a threshold pressure, and inflating the second chamber portion in response to releasing the releasable bulkhead.

In various embodiments, the releasable bulkhead may include a first mating portion and a second mating portion. The method may further comprise the step of coupling the first mating portion to the second mating portion to restrict a fluid flow between the first chamber portion and the second chamber portion. The method may further comprise the step of separating the first mating portion from the second mating portion in response to a pressure within the first chamber portion exceeding the threshold pressure to permit fluid flow between the first chamber portion and the second chamber portion. The method may further comprise the steps of deflating the inflatable evacuation device, recoupling the releasable bulkhead between the first chamber portion and the second chamber portion within the chamber. The method may further comprise the steps of increasing pressure within the chamber to re-inflate the first chamber portion, restricting inflation of the second chamber, by the releasable bulkhead, during inflation of the first chamber portion, releasing the releasable bulkhead in response to the pressure within the first chamber portion exceeding the threshold pressure, and re-inflating the second chamber portion in response to releasing the releasable bulkhead.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIGS. 6A, 6B and 6C illustrate a top view and cross sectional views of an inflatable evacuation device having an internal releasable bulkhead, in accordance with various embodiments.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, optical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein and with reference to an aircraft evacuation device, "proximal" refers to a head end, and "distal" refers to a toe end.

The present disclosure relates to inflatable evacuation devices, such as slides, slide rafts, life rafts, or other evacuation devices. Various structures may aid in controlling the inflation process of the inflatable evacuation device during deployment and/or may aid in controlling the airflow and air pressure within the inflatable evacuation device during deployment and after deployment. In various embodiments, releasable bulkheads disposed internally to an inflatable chamber of the evacuation device may be used to control the airflow and air pressure within the inflatable chamber during deployment. A releasable bulkhead may be configured to de-couple or release in response to internal pressure of an inflatable chamber. An internal releasable bulkhead that is reusable is provided in various embodiments. Internal releasable bulkheads may be re-coupled and used during subsequent deployments of the inflatable evacuation device.

Figure 1:
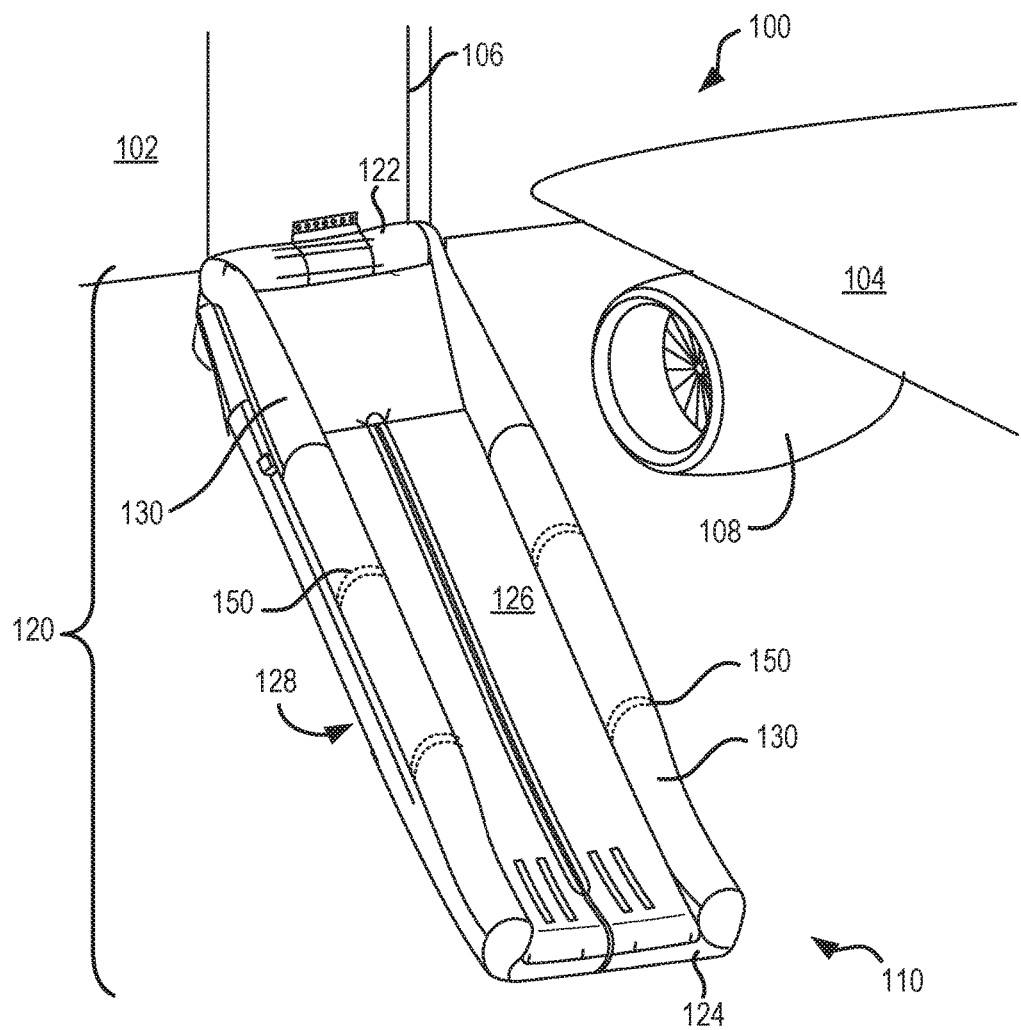
FIG. 1 illustrates a perspective view of an inflatable evacuation device in a deployed position, in accordance with various embodiments.

With reference to FIG. 1, a partial perspective view of an aircraft 100 having an evacuation system 110 is illustrated, in accordance with various embodiments. Aircraft 100 may comprise a fuselage 102 with wing 104 fixed to fuselage 102. Engine 108 may be coupled to an underside of wing 104. Aircraft 100 may include an evacuation system 110. Evacuation system 110 may include an inflatable evacuation device 120, which may be a slide, a slide raft, a life raft, or other floatation device. Evacuation system 110 may include an inflation source 112 coupled to inflatable evacuation device 120 and configured to inflate the inflatable evacuation device 120. The inflation source 112 may be a compressed gas tank, an inflation cylinder, pyrotechnic apparatus or other suitable inflation device. Evacuation system 110 including inflatable evacuation device 120 and inflation source 112 may be stored in an undeployed condition in a packboard housing inside the fuselage 102 of aircraft 100. Inflatable evacuation device 120 may be deployed from an emergency exit door 106 of aircraft 100. In various embodiments, for example, evacuation system 110 may deploy the inflatable evacuation device 120 in response to an emergency exit door 106 opening.

Inflatable evacuation device 120 may comprise a head end or proximal end 122 and a toe end or distal end 124, which is opposite proximal end 122. Proximal end 122 of inflatable evacuation device 120 may be secured to aircraft 100, such as by a girt. Inflatable evacuation device 120 may comprise at least one chamber, such as chamber 130. One or more chambers 130 may be configured to inflate by receiving pressurized gas from inflation source. Inflatable evacuation device 120 may comprise a sliding surface 126 (also referred to as a top surface) and a rear surface 128 (also known as an underside surface) that is opposite sliding surface 126.

In various embodiments, inflatable evacuation device 120 may comprise a plurality of releasable bulkheads 150, which are internal to inflatable evacuation device 120. Releasable bulkheads 150 may be disposed internally to chamber 130 and may be used to control the airflow and air pressure within chamber 130 during deployment of inflatable evacuation device 120. Releasable bulkheads 150 may be configured to release at a predetermined pressure during inflation of inflatable evacuation device 120, and further, may be configured to recouple for use during a subsequent deployment. Inflatable evacuation device 120 is illustrated in FIG. 1 as an inflatable slide in an inflated and/or deployed position. Toe end 124 may be configured to contact an exit surface in response to evacuation slide 110 being deployed.

Figure 2:
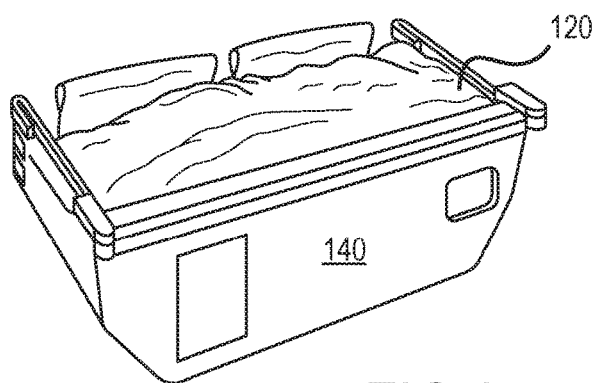
FIG. 2 illustrates a perspective view of an evacuation slide in a stowed position, in accordance with various embodiments.

With reference to FIG. 2, an inflatable evacuation device is illustrated in a stowed and/or packed position, in accordance with various embodiments. Inflatable evacuation device 120 may be stowed in a packboard 140. In various embodiments, inflatable evacuation device 120 may be folded in the stowed position. In various embodiments, inflatable evacuation device 120 may be deployed from packboard 140 in response to opening an emergency exit door. Packboard 140 may be coupled to an aircraft in an installed position. Typically, a packboard 140 includes a blow-out panel which opens in response to deployment of inflatable evacuation device 120 through which opening the inflatable may exit the packboard. In this regard, inflatable evacuation device 120 may be configured to be deployed from an aircraft.

Figure 3A:
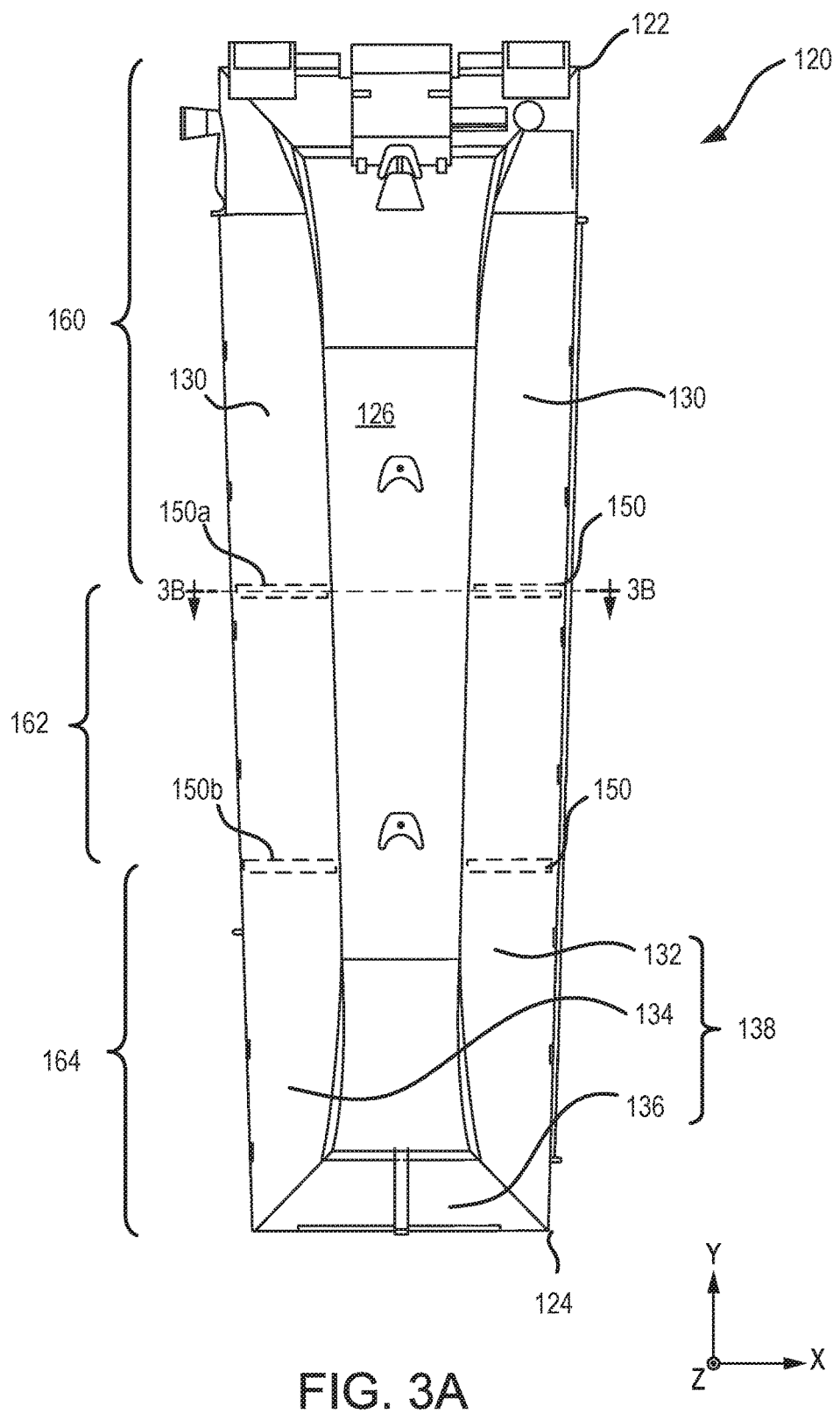
FIGS. 3A, 3B, 3C and 3D illustrates a top view and cross sectional views of an inflatable evacuation device having an internal releasable bulkhead, in accordance with various embodiments.

With reference to FIG. 3A, a top view of an inflatable evacuation device 120 is shown, in accordance with various embodiments. Chamber 130 may extend from a proximal end 122 to distal end 124 of inflatable evacuation device 120. Chamber 130 may include a plurality of tubes comprising one continuous gas fillable chamber. Chamber 130 may be defined by longitudinal tubes 132, 134 extending from a proximal end 122 of inflatable evacuation device 120 to distal end 124 of inflatable evacuation device 120. Chamber 130 may further be defined by one or more transverse tubes 136 extending between longitudinal tubes 132, 134. Longitudinal tubes 132, 134 may be maintained in a spaced-apart configuration by transverse tubes 136, for example, located at a proximal end 122 and/or at a distal end 124 of inflatable evacuation device 120. Sliding surface 126 may be coupled to and bordered by longitudinal tubes 132, 134 and transverse tubes 136. Longitudinal tubes 132, 134 and transverse tubes 136, may be referred to as tubes 138. Thus, one or more of tubes 138 may define chamber 130. Chamber 130 and sliding surface 126 may be comprised of a flexible fabric. The flexible fabric may comprise a base cloth with coating, such as nylon or ballistic nylon coated in polyurethane, neoprene and/or aluminum or other suitable coating.

A tube 138 may include one or more internal releasable restraints or releasable bulkheads 150 coupled to an internal surface of the tube 138. Releasable bulkheads 150 may be positioned within the longitudinal tubes 132, 134 between the portions of the tubes to restrict fluid flow between portions of the tubes. For example, a first releasable bulkhead 150a may be positioned within longitudinal tube 134 to define a first chamber portion 160 and a second chamber portion 162 within longitudinal tube 134. A second releasable bulkhead 150b may be positioned within longitudinal tube 134 to define a third chamber portion 164 within longitudinal tube 134. Longitudinal tube 132 may similarly include one or more releasable bulkheads 150 defining two or more chamber portions within longitudinal tube 132.

Figure 3B:
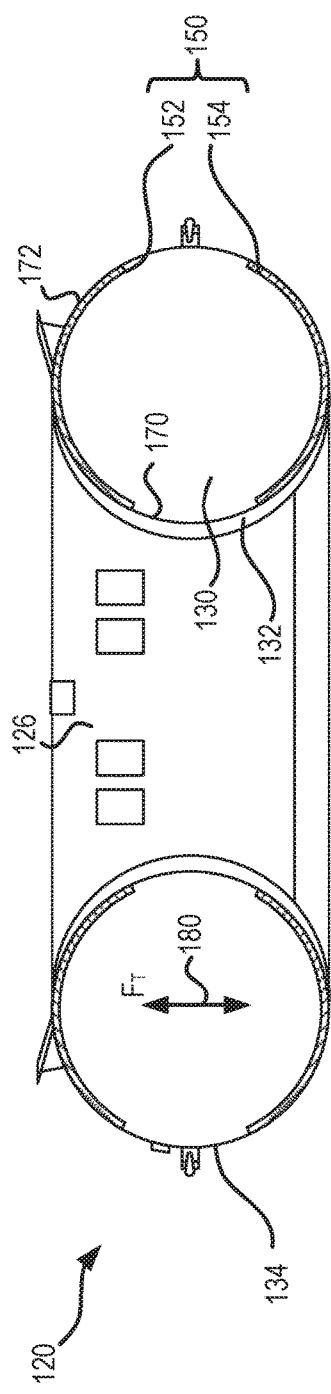

FIG. 3B shows a cross section of inflatable evacuation device 120 taken along line 3B-3B from FIG. 3A, in accordance with various embodiments. FIG. 3B shows inflatable evacuation device 120 in an inflated and/or deployed state. In various embodiments, the inflatable evacuation device 120 comprises one or more releasable bulkhead 150 coupled to an inner surface 170 of each tube, such as longitudinal tubes 132, 134. A releasable bulkhead 150 may comprise a first mating portion 152 and a second mating portion 154. During deployment of inflatable evacuation device 120, a releasable bulkhead 150 within longitudinal tube 134 may decouple in response to a force F (illustrated by arrows 180) applied to first mating portion 152 and second mating portion 154 by longitudinal tube 134 exceeding a predetermined threshold force. Similarly, a releasable bulkhead 150 within longitudinal tube 134 may decouple in response to a force F exceeding a predetermined threshold force. The force F may be generated in response to the internal pressure of inflatable evacuation device 120, for example during inflation. More specifically, force F may be generated in response to the internal pressure of first chamber portion 160 (see FIG. 3A). Upon release of releasable bulkhead 150, a distal chamber portion, such as second chamber portion 162 (see FIG. 3A), may be configured to inflate by fluid from first chamber portion 160 freely flowing into second chamber portion 162.

Figure 3C:
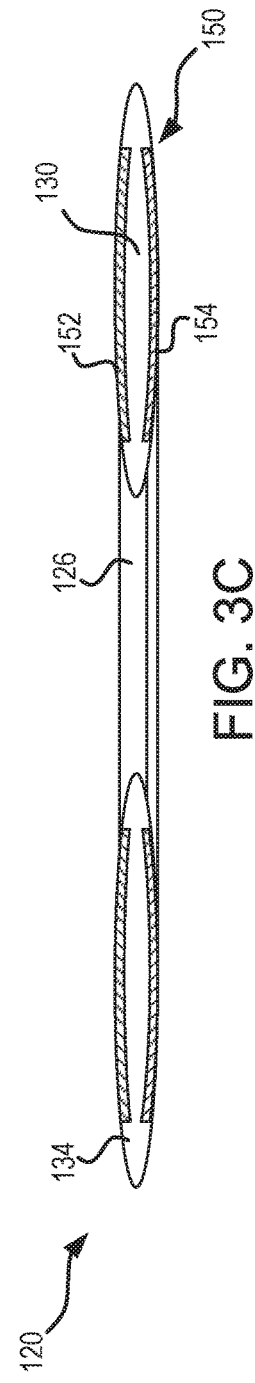

FIG. 3C shows inflatable evacuation device 120 in a deflated state with the releasable bulkhead 150 disengaged. In various embodiments, a pressure within chamber 130 may be decreased to deflate inflatable evacuation device 120, for example, to prepare inflatable evacuation device 120 for a subsequent deployment.

Figure 3D:
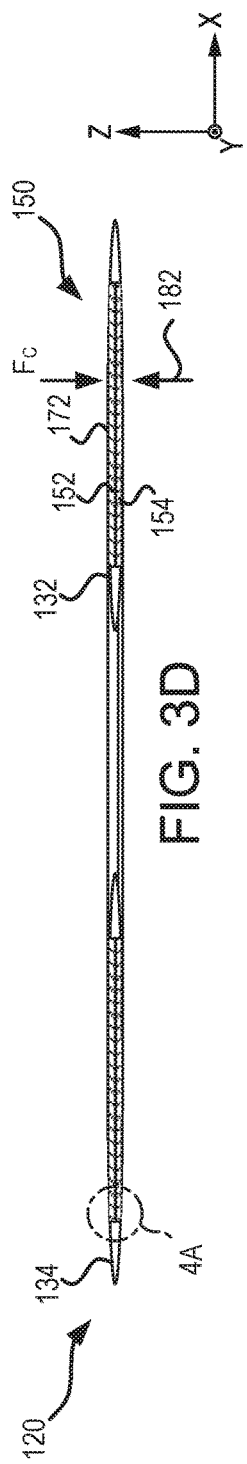

FIG. 3D shows inflatable evacuation device 120 in a deflated state with releasable bulkhead 150 in an engaged state. In response to a compressive force $F_C$ (i.e., in a direction illustrated by arrows 182) applied to first mating portion 152 and/or second mating portion 154, first mating portion 152 and second mating portion 154 may be releasably coupled together. Referring to longitudinal tube 132, first mating portion 152 and second mating portion 154 may be manually coupled by applying the compressive force $F_C$ to an outer surface 172 of longitudinal tube 132.

For example, first mating portion 152 and second mating portion 154 may be configured to releasably engage to restrict a fluid flow between a first chamber portion 160 and a second chamber portion 162. First mating portion 152 and second mating portion 154 may be configured to releasably engage to form a blocking portion 200 that restricts fluid flow between first chamber portion 160 and second chamber portion 162 (FIG. 3A). Stated differently, releasable bulkhead 150 in an engaged state may operate as blocking portion 200 formed by first mating portion 152 being coupled to second mating portion 154. First chamber portion 160 and second chamber portion 162 may be fluidly isolated, or may be in minor fluid communication, while releasable bulkhead 150 is engaged. Where some fluid may flow around releasable bulkhead 150 while releasable bulkhead 150 is in an engaged state, releasable bulkhead 150 maintains enough barrier to fluid flow between first chamber portion 160 and second chamber portion 162, such that first chamber portion 160 may maintain a greater pressure than second chamber portion 162 until releasable bulkhead 150 disengages, i.e., until a pressure within first chamber portion 160 reaches a threshold pressure. In various embodiments, first mating portion 152 may releasably engage with second mating portion 154 to form a friction fit. For example, first mating portion 152 and second mating portion 154 may comprise at least one of a hook and loop, a snap, an interlocking rib and groove, or other mechanical restraint.

Figure 4B:
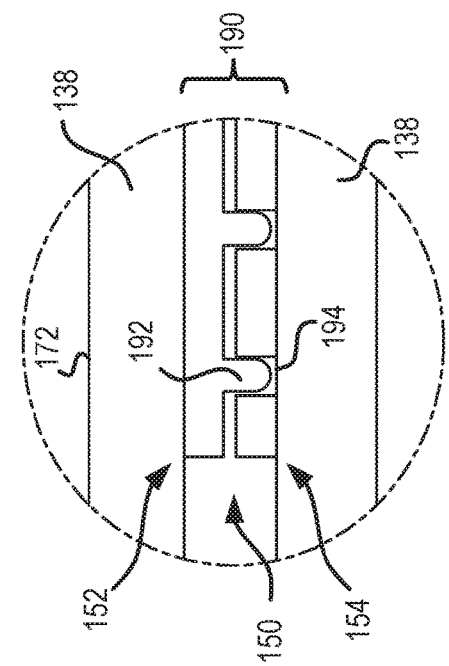
FIGS. 4A and 4B illustrate additional schematic views of an internal releasable bulkhead, in accordance with various embodiments.
Figure 4A:
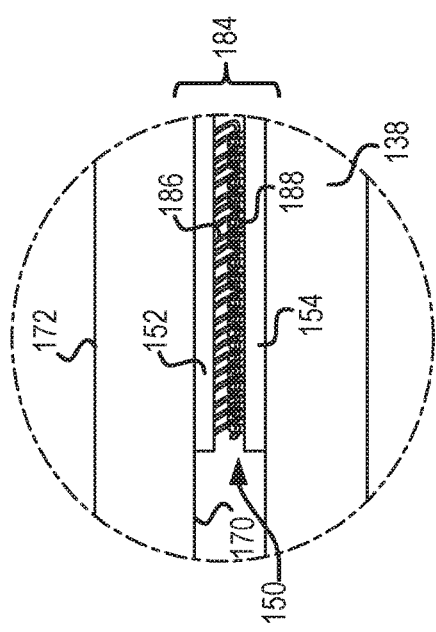

Referring momentarily to FIGS. 4A and 4B, a releasable bulkhead 150 is shown, in accordance with various embodiments. FIG. 4A shows a releasable bulkhead 150 comprising a hook and loop 184. For example, first mating portion 152 may comprise a plurality of hooks 186, and second mating portion 154 may comprise a plurality of loops 188. Hooks 186 may be configured to interface with loops 188 to form a friction fit.

FIG. 4B shows a releasable bulkhead 150 comprising one or more snaps 190. For example, first mating portion 152 may comprise a protrusion 192, and second mating portion 154 may comprise a receptacle 194. Protrusion 192 may be configured to fit within the receptacle 194 to form a press fit or friction fit, i.e. a snap 190. Protrusion 192 may have a complementary shape to receptacle 194. It will be understood that protrusion 192 may have any geometry which interfaces with receptacle 194, such as a cone, cylinder, cube, irregular shape or other shape, and may have ridges, hooks or other surface features. A plurality of snaps 190 or a strip of snaps 190 may be coupled to inner surface 170 of a tube 138.

Returning to FIG. 3B, first mating portion 152 may be configured to separate from second mating portion 154 in response to a force F applied to the releasable bulkhead 150 exceeding the threshold force. In response to the force F overcoming or exceeding the threshold force of releasable bulkhead 150, first mating portion 152 and second mating portion 154 may decouple.

Figure 5:
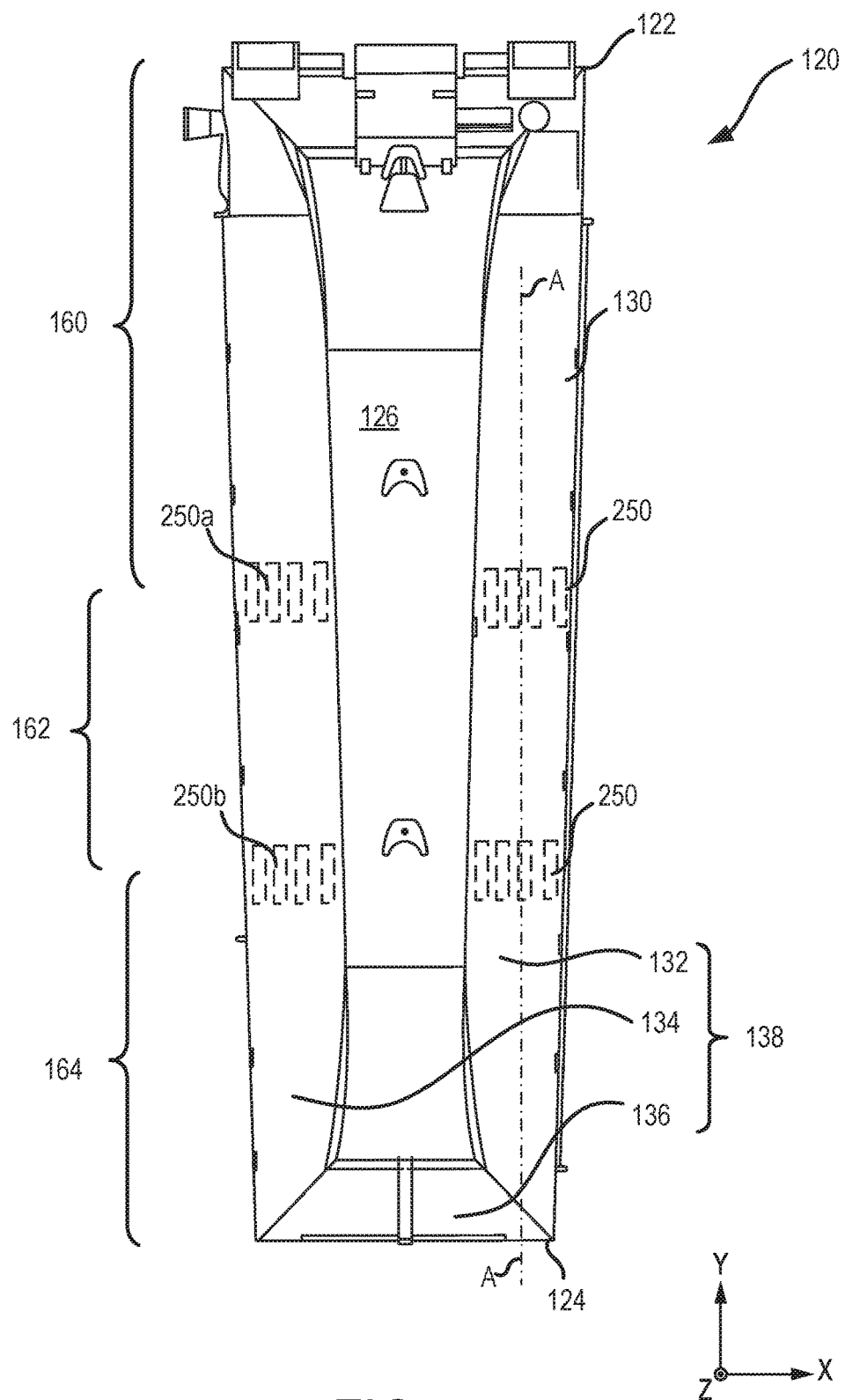
FIG. 5 illustrates a top view of an inflatable evacuation device having an internal releasable bulkhead, in accordance with various embodiments.

With reference to FIG. 5, a top view of an inflatable evacuation device 120 is shown, in accordance with various embodiments. A tube 138, such as longitudinal tubes 132 and 134, may include one or releasable bulkheads 250 coupled to an internal surface of the tube 138. Releasable bulkheads 250 may be positioned within tubes 138 between the portions of the tubes to restrict fluid flow between portions of the tubes. For example, a first releasable bulkhead 250a may be positioned within longitudinal tube 134 to define first chamber portion 160 and second chamber portion 162 within longitudinal tube 134. A second releasable bulkhead 250b may be positioned within longitudinal tube 134 to define third chamber portion 164 within longitudinal tube 134. Longitudinal tube 132 may similarly include one or more releasable bulkheads 250 defining two or more chamber portions within longitudinal tube 132.

In various embodiments, releasable bulkheads 250 may comprise at least one of a hook and loop, a snap, an interlocking rib and groove, or other mechanical restraint. For example, releasable bulkheads 250 may include one or more strips of snaps or strips of hooks and piles. The strips may be disposed within tube 138 along a longitudinal axis A-A' of tube 138. FIG. 5 shows each releasable bulkheads 250 having a plurality of strips which extend longitudinally along the inner surface of the tube 138, i.e, along a longitudinal axis A-A' of tube 138. In various embodiments, releasable bulkheads 250 may extend transversely across the inner surface of the tube, as shown in FIGS. 3A-3D.

Figure 6A:
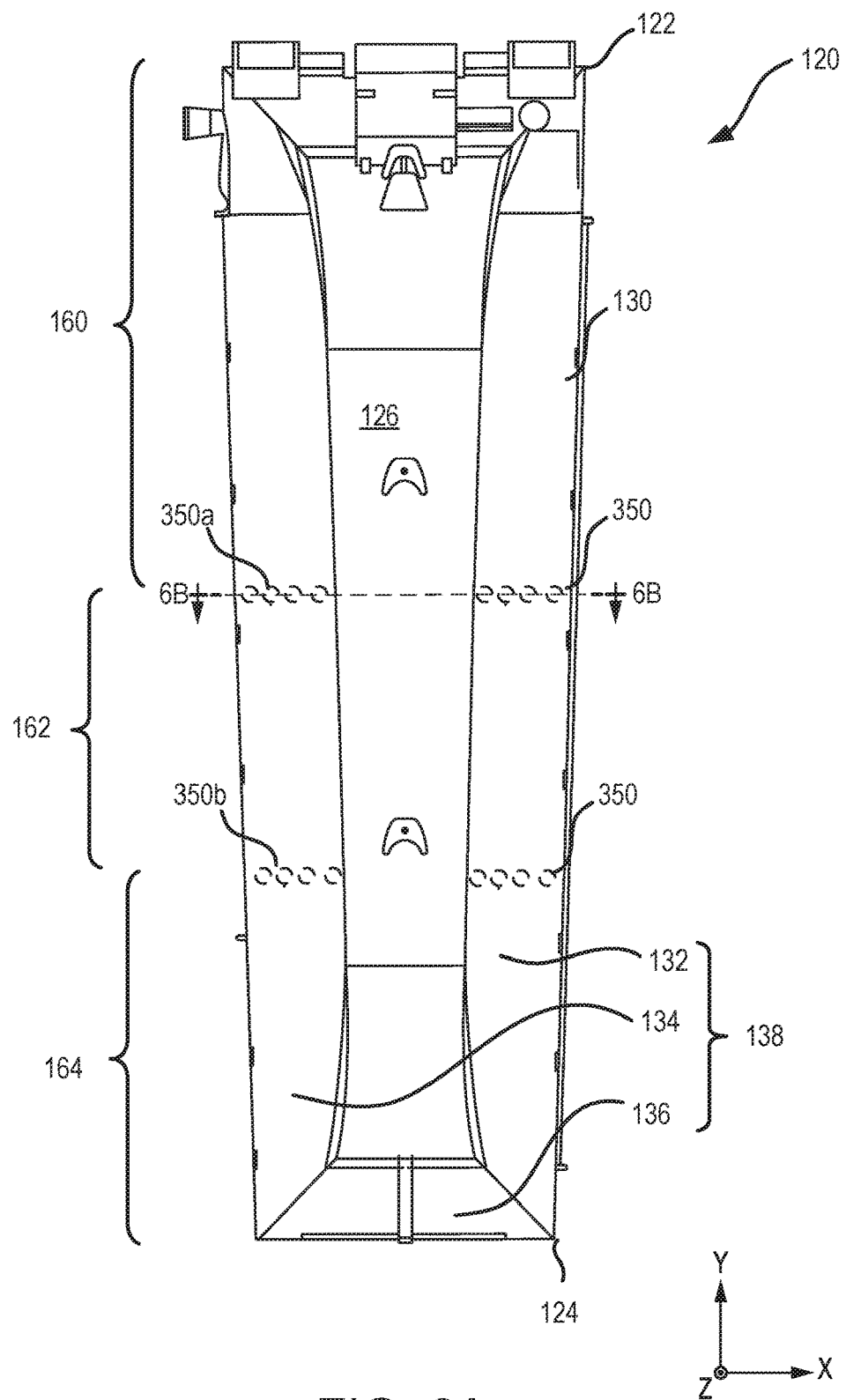

FIG. 6B shows a cross section of inflatable evacuation device 120 taken along line 6B-6B from FIG. 6A, in accordance with various embodiments. FIG. 6B shows inflatable evacuation device 120 in an inflated and/or deployed state. A tube 138, such as each of longitudinal tubes 132 and 134, may include one or releasable bulkheads 350 coupled to an internal surface of the tube 138. Releasable bulkheads 350 may be positioned within tubes 138 between the portions of the tubes to restrict fluid flow between portions of the tubes. For example, a first releasable bulkhead 350a may be positioned within longitudinal tube 134 to define first chamber portion 160 and second chamber portion 162 within longitudinal tube 134. A second releasable bulkhead 350b may be positioned within longitudinal tube 134 to define third chamber portion 164 within longitudinal tube 134. Longitudinal tube 132 may similarly include one or more releasable bulkheads 350 defining two or more chamber portions within longitudinal tube 132.

In various embodiments, releasable bulkheads 350 may comprise a plurality of discrete fasteners 360, which may be snaps. For example, each fastener 360 of the releasable bulkheads 350 may comprise may comprise a protrusion 362, i.e., a first mating portion 352, receptacle 364, i.e, a second mating portion 354. Protrusion 362 may be configured to fit within the receptacle 364 to form a press fit or friction fit, i.e. a snap 190. A protrusion 362 may have a complementary shape to a receptacle 264. It will be understood that protrusion 362 may have any geometry which interfaces with receptacle 364, such as a cone, cylinder, cube, irregular shape or other shape, and may have ridges, hooks or other surface features. A plurality of discrete fasteners 360 may be coupled to inner surface 170 of a tube 138.

FIG. 6C shows a cross section of inflatable evacuation device 120 in a deflated state with releasable bulkheads 350 in an engaged state. In response to a compressive force $F_C$ (i.e., in a direction illustrated by arrows 182) applied to first mating portion 352 and/or second mating portion 354, first mating portion 352 and second mating portion 354 may be releasably coupled together. First mating portion 352 and second mating portion 354 may be manually coupled by applying the compressive force $F_C$ to an outer surface 172 of tube 138.

For example, first mating portion 352 and second mating portion 354 may be configured to releasably engage to restrict or limit a fluid flow between a first chamber portion 160 and a second chamber portion 162 (FIG. 6A). First mating portion 352 and second mating portion 354 may be configured to releasably engage to form a blocking portion 200 that restricts fluid flow between first chamber portion 160 and second chamber portion 162 (FIG. 3A). Stated differently, releasable bulkhead 350 in an engaged state may operate as blocking portion 200 formed by first mating portion 352 being coupled to second mating portion 354. First chamber portion 160 and second chamber portion 162 may be fluidly isolated, or may be in minor fluid communication, while releasable bulkhead 350 is engaged. Where some fluid may flow around releasable bulkhead 350 while releasable bulkhead 350 is in an engaged state, releasable bulkhead 350 maintains enough barrier to fluid flow between first chamber portion 160 and second chamber portion 162, such that first chamber portion 160 may maintain a greater pressure than second chamber portion 162 until releasable bulkhead 350 disengages, i.e., until a pressure within first chamber portion 160 reaches a threshold pressure.

Figure 7:
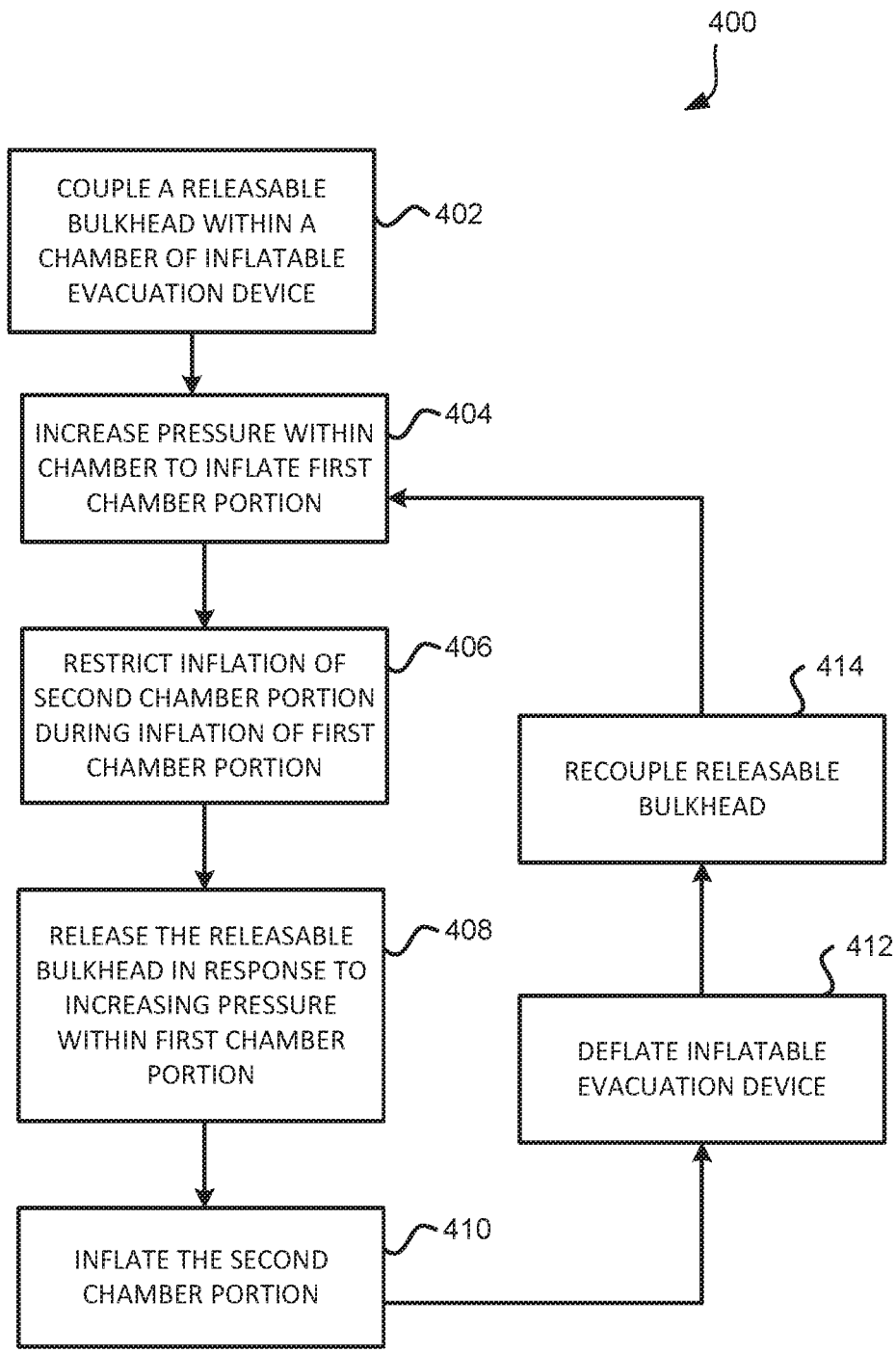
FIG. 7 illustrates a method for deploying an inflatable evacuation device, in accordance with various embodiments.

With reference to FIG. 7, a method 400 for deploying an inflatable evacuation device is shown, in accordance with various embodiments. Method 400 may comprise the step of coupling a releasable bulkhead to an inner surface of a chamber of the inflatable evacuation device (step 402). The releasable bulkhead may define a first chamber portion and a second chamber portion within the chamber 130. Method 400 may comprise the steps of increasing pressure within the chamber to inflate the first chamber portion (step 404), restricting inflation of the second chamber during inflation of the first chamber portion (step 406), releasing the releasable bulkhead in response to increasing the pressure within the first chamber portion (step 408), and inflating the second chamber portion in response to releasing the releasable bulkhead (step 410).

Step 402 may further comprise coupling a releasable bulkhead to an inner surface of a chamber of the inflatable evacuation device to define a first chamber portion and a second chamber portion within the chamber. In various embodiments, the releasable bulkhead 150 may include a first mating portion 152 and a second mating portion 154. Step 402 may further include coupling the first mating portion 152 to the second mating portion 154 by applying a compressive force to the mating portions 152, 154.

Method 400 may comprise deploying inflatable evacuation device 120 in response to opening an emergency exit door 106 of aircraft 100. In that regard, step 404 may comprise increasing pressure within the chamber to inflate the first chamber portion of inflatable evacuation device 120 in response to opening the emergency exit door 106 of aircraft 100.

Step 406 may further comprise restricting inflation of the second chamber, by the releasable bulkhead, during inflation of the first chamber portion.

Step 408 may further comprise releasing the releasable bulkhead in response to a pressure within the first chamber portion exceeding a threshold pressure. Step 408 may further comprise separating or decoupling the first mating portion from the second mating portion in response to a pressure within the first chamber portion exceeding the threshold pressure to permit fluid flow between the first chamber portion and the second chamber portion. The deployment of inflatable evacuation device 120 may apply a force to releasable bulkhead 150, causing second mating portion 154 to decouple from first mating portion 152. Inflatable evacuation device 120 may be an inflatable and may be used as an evacuation slide.

Releasable bulkhead 150 may be reassembled by re-coupling releasable bulkhead 150 for reuse, for example, during a subsequent deployment of inflatable evacuation device 120. Method 400 may comprise the steps of deflating the inflatable evacuation device (step 412), and recoupling the releasable bulkhead between the first chamber portion and the second chamber portion within the chamber (step 414). Step 414 may further include recoupling the first mating portion 152 to the second mating portion 154 by applying a compressive force to the mating portions 152, 154. In this regard, first mating portion 152 and second mating portion 154 are configured to be releasably coupled, decoupled, and subsequently recoupled for reuse of releasable bulkhead 150.

After recoupling the releasable bulkhead 150, any of steps 404 through 410 may be repeated. For example, steps 404 to 410 may be performed after a first deployment inflatable evacuation device 120. Inflatable evacuation device 120 may be deployed again, by increasing the pressure within inflatable evacuation device 120, causing releasable bulkhead 150 to decouple in response to the increased pressure, and allowing inflatable evacuation device 120 to inflate. Accordingly, method 400 may further comprise the steps of increasing pressure within the chamber to re-inflate the first chamber portion, restricting inflation of the second chamber portion, by the releasable bulkhead, during inflation of the first chamber portion, releasing the releasable bulkhead in response to the pressure within the first chamber portion exceeding the threshold pressure, and re-inflating the second chamber portion in response to releasing the releasable bulkhead. Thus, releasable bulkhead 150 may be reusable.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An inflatable evacuation device, comprising:
   a tube defining a chamber; and
   a releasable bulkhead coupled to an inner surface of the tube and defining a first chamber portion and a second chamber portion within the chamber, the releasable bulkhead comprising a first mating portion and a second mating portion, the second mating portion being opposite the first mating portion;
   wherein the first mating portion and the second mating portion are configured to releasably engage to restrict a fluid flow between the first chamber portion and the second chamber portion.

2. The inflatable evacuation device of claim 1, wherein the first mating portion is configured to separate from the second mating portion in response to a force applied to the releasable bulkhead exceeding a threshold force.

3. The inflatable evacuation device of claim 2, wherein the second chamber portion is configured to inflate in response to the first mating portion separating from the second mating portion.

4. The inflatable evacuation device of claim 1, wherein the first mating portion and the second mating portion comprise at least one of a hook and loop or a snap.

5. The inflatable evacuation device of claim 1, wherein the first mating portion and the second mating portion are configured to releasably engage to form a blocking portion configured to restrict the fluid flow between the first chamber portion and the second chamber portion.

6. The inflatable evacuation device of claim 1, wherein the releasable bulkhead extends transversely across the inner surface of the tube.

7. The inflatable evacuation device of claim 1, wherein the releasable bulkhead extends longitudinally along the inner surface of the tube.

8. An evacuation system comprising:
   an inflatable evacuation device having a tube defining a chamber, the inflatable evacuation device comprising a releasable bulkhead coupled to an inner surface of the tube, the releasable bulkhead having a first mating portion and a second mating portion, the second mating portion being opposite the first mating portion;
   wherein the second mating portion is configured to separate from the first mating portion in response to a force applied to the releasable bulkhead exceeding a threshold force.

9. The evacuation system of claim 8, wherein the releasable bulkhead defines a first chamber portion and a second chamber portion within the chamber.

10. The evacuation system of claim 9, wherein the first mating portion and the second mating portion releasably engage to restrict a fluid flow between the first chamber portion and the second chamber portion.

11. The evacuation system of claim 9, wherein the second chamber portion is configured to inflate in response to the first mating portion separating from the second mating portion.

12. The evacuation system of claim 9, wherein the force applied to the releasable bulkhead is due to a pressure increase that causes the first chamber portion to inflate.

13. The evacuation system of claim 8, wherein the first mating portion and the second mating portion comprise at least one of a hook and loop or a snap.

14. The evacuation system of claim 8, wherein the releasable bulkhead is reusable.

15. A method for deploying an inflatable evacuation device, comprising:
- coupling a releasable bulkhead to an inner surface of a chamber of the inflatable evacuation device to define a first chamber portion and a second chamber portion within the chamber, wherein the releasable bulkhead includes a first mating portion and a second mating portion, the second mating portion being opposite the first mating portion;
- coupling the first mating portion to the second mating portion to restrict a fluid flow between the first chamber portion and the second chamber portion;
- increasing pressure within the chamber to inflate the first chamber portion;
- restricting inflation of the second chamber portion, by the releasable bulkhead, during inflation of the first chamber portion;
- releasing the releasable bulkhead in response to a pressure within the first chamber portion exceeding a threshold pressure; and
- inflating the second chamber portion in response to releasing the releasable bulkhead.

16. The method of claim 15, further comprising decoupling the first mating portion from the second mating portion in response to the pressure within the first chamber portion exceeding the threshold pressure to permit fluid flow between the first chamber portion and the second chamber portion.

17. The method of claim 15, further comprising:
- deflating the inflatable evacuation device; and
- recoupling the releasable bulkhead between the first chamber portion and the second chamber portion within the chamber.

18. The method of claim 17, further comprising:
- increasing pressure within the chamber to re-inflate the first chamber portion;
- restricting inflation of the second chamber portion, by the releasable bulkhead, during inflation of the first chamber portion;
- releasing the releasable bulkhead in response to the pressure within the first chamber portion exceeding the threshold pressure; and
- re-inflating the second chamber portion in response to releasing the releasable bulkhead.

* * * * *